United States Patent [19]
Filthuth

[11] Patent Number: 5,066,862
[45] Date of Patent: Nov. 19, 1991

[54] DEVICE FOR DETECTING IONIZING RADIATION

[76] Inventor: Heinz Filthuth, Bahnhofstrasse 29, D-7540 Neuenburg, Fed. Rep. of Germany

[21] Appl. No.: 522,714

[22] Filed: May 14, 1990

[30] Foreign Application Priority Data

May 12, 1989 [DE] Fed. Rep. of Germany ....... 3915612

[51] Int. Cl.$^5$ ............................................. H01J 47/00
[52] U.S. Cl. .................................. 250/393; 250/328; 250/336.1
[58] Field of Search ................. 250/393, 385.1, 336.1, 250/374, 328, 505.1

[56] References Cited
U.S. PATENT DOCUMENTS
4,686,369 8/1987 McDaniel et al. ................. 250/374

FOREIGN PATENT DOCUMENTS
2190787 11/1987 United Kingdom ............. 250/385.1

Primary Examiner—Carolyn E. Fields
Assistant Examiner—James E. Beyer
Attorney, Agent, or Firm—Spensley Horn Jubas & Lubitz

[57] ABSTRACT

A device for detecting ionizing radiation emanating from a plurality of samples, said device comprising: a receptacle having a planar surface and provided with a plurality of recesses each for holding a respective sample, each said recess being open at said surface; a cover member having at least one planar electrically conductive member provided with openings, said conductive member being spaced from said receptacle and being disposed parallel to said planar surface; and a voltage source connected to place said electrically conductive member at a potential which is positive relative to the potential of said planar surface.

8 Claims, 1 Drawing Sheet

DEVICE FOR DETECTING IONIZING RADIATION

FIELD OF THE INVENTION

The invention relates to a device for detecting ionizing radiation emanating from a plurality of samples placed in recesses of a sample receptacle, for example fluids or solid substances in test tubes or micro-titrating plates.

BACKGROUND OF THE INVENTION

In the area of medical technology it is a common detection method to test the characteristics of certain body-specific substances or tissue parts by mixing them with suitable radioactive substances or by enriching them with radioactive materials. For the efficient evaluation of such samples, they are placed into receptacles, such as bulbs, test tubes or other recesses such as, for example, micro-titrating plates. One difficulty associated with this technique lies in the fact that the samples cover the bottom of these recesses and therefore are at least a few millimeters distant from the free surface which is accessible to a detector. In particular, in connection with the use of radioactive substances which emit only low-energy ionizing radiation, this spatial arrangement impairs the detection sensitivity of the detector, because it is not possible to bring the entrance plane of the detector sufficiently close to the respective substances. Very often tritium and J125 markers are used in these cases, in particular in connection with receptor assays.

These tests are often made for hundreds of thousands of samples by means of a liquid scintillation counter, which requires considerable time and effort.

SUMMARY OF THE INVENTION

It is therefore an object of the present invention to provide a device for the detection of such low-energy ionizing radiation by means of which the radiation can be quantitatively directly and simultaneously detected for large numbers of samples, even if the samples are placed in recesses in relation to the accessible surface of the respective sample receptors.

The above and other objects are attained, in accordance with the invention, by the provision of a crown above the plane of the openings of the recesses which crown contains, parallel to this plane, at least one electrically conductive, second plane which is connected to a higher (positive) electrical potential than the first-mentioned plane. An electrical suction field is created by this difference in potential, by means of which the primary and secondary particles being created are "pulled out" of the respective sample receptacles and are accelerated in the direction towards the second plane. This offers the possibility of disposing directly above this second plane a suitable radiation detector, for example a location-sensitive counting tube, by means of which the radiation portion emanating from the individual recesses can be detected and associated with the respective samples.

In this way sufficiently high counting rates can be achieved, so that the samples contained in the recesses can be directly detected there and no longer need to be removed or separately measured.

Depending on the field of use, for example the type of sample receptacles used and/or detector used, this radiation-permeable, electrically conductive second plane for the creation of the suction field can be realized in various ways, for example from a wire mesh or a metallic perforated plate. In every case it is of importance that there be a sufficient potential difference between the sample receptacles and the second plane, the value of which can be determined in individual cases also by the dimensions of the sample receptacles, for example the depth of the recesses in a micro-titrating plate.

Three exemplary embodiments of devices in accordance with the invention will be described in detail with reference to the drawings.

DESCRIPTION OF THE PREFERRED EMBODIMENTS

Figure 1:
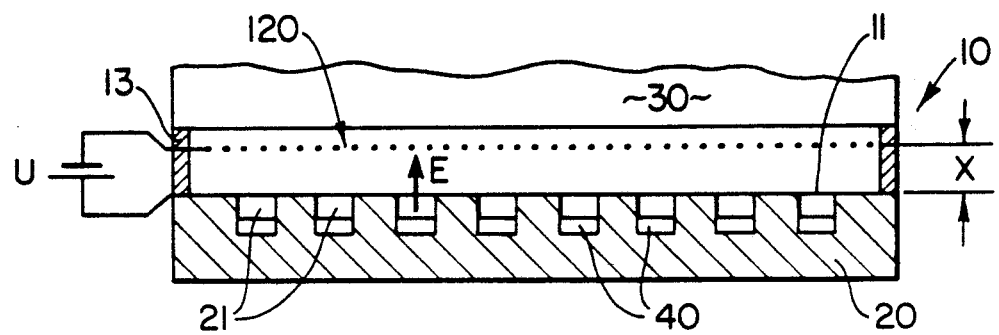
FIG. 1 is a cross-sectional view of a first exemplary embodiment of a device according to the invention provided with a crown on a micro-titrating plate.
Figure 2:
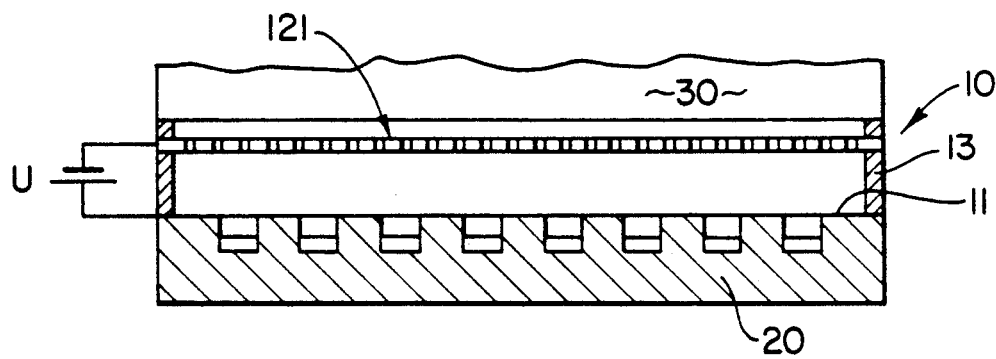
FIG. 2 is a cross-sectional view of a second exemplary embodiment.
Figure 3:
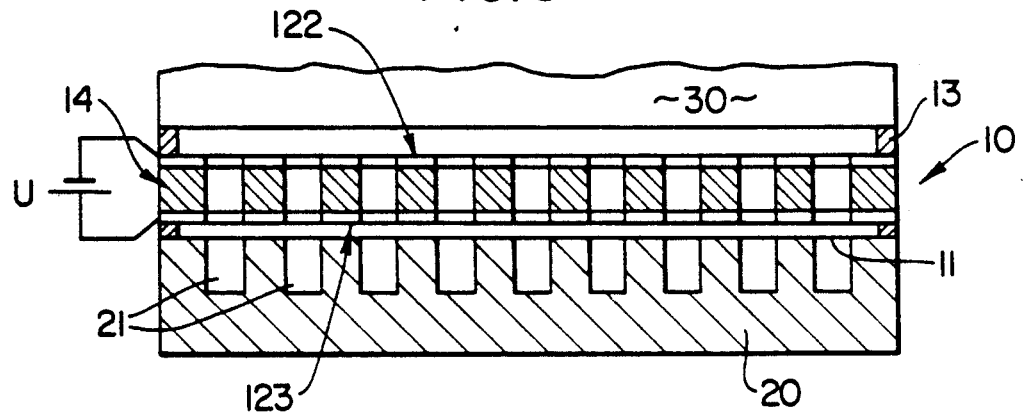
FIG. 3 is a cross-sectional view of a third exemplary embodiment.

The sample receptacle 20 shown in FIGS. 1 to 3 is a micro-titrating plate, in the cup-shaped cylindrical recesses 21 of which are placed individual samples 40 whose radioactivity is to be determined. In place of the micro-titrating plate shown by way of example, suitable racks with bulbs or test tubes may be used, such as are used in a laboratory. The top of sample receptacle 20 is defined by a first plane 11.

In accordance with the invention, a part 120 of a crown 10 defines a radiation-permeable, electrically conductive, second plane above plane 11, such that this second, electrically conductive, plane is located at a distance x above the first plane 11 of the sample receptacle.

This crown part defining this upper, electrically conductive, second plane is connected to voltage source to be at a higher electrical potential than the plane 11 of the sample receptacle 20, so that an electric suction field is created, which is symbolized by the arrow E in FIG. 1.

Low-energy, radioactive radiation emanating from the samples 40 is accelerated away from the sample receptacle 20, i.e. out of the recesses 21, by this suction field E and penetrates the radiation-permeable second plane.

Here the radiation particles reach a suitable radioactive detector 30 disposed on crown 10, detector 30 having an entrance plane located above, and parallel to the first and second planes. In each actual case of use, the desired spacings between plane 11, the electrically conductive, second plane, the entrance plane of detector 30 are defined by a frame 13, which therefore can also serve as a spacer.

To this extent the functional principle of the three exemplary embodiments illustrated in FIGS. 1 to 3 is the same. For example, the distance x has been selected to be less than 10 mm and the potential of the second, electrically conductive plane is set to a value of 1,000 Volts.

The exemplary embodiments differ in the nature of the structure of the second, electrically conductive plane: In the exemplary embodiment of FIG. 1, a metallic wire mesh 120 is provided for this, in the exemplary embodiment of FIG. 2 a metallic, perforated plate 121 is employed, and in the exemplary embodiment of FIG. 3 there is provided a perforated plate 14 made of an insulating material, on the upper surface of which an electrically conductive layer, sheet, or coating 122 defining the second plane has been applied and on the lower surface of which an additional, electrically conductive layer, sheet, or layer 123 defining a further plane is provided.

While in the first two exemplary embodiments the potential difference required to create the electrical suction field E is present between the wire mesh 120 or perforated plate 121 on the one side and the plane 11 of sample receptacle 20, in the exemplary embodiment of FIG. 3 this potential difference exists between the two planar conductive layers, sheets, or coatings 122 and 123. In this case the lower layer 123 may be, as shown, a short distance above, or may lie directly on, surface 11 of sample receptacle 20. In both cases, lower layer 123 also defines the potential of plane 11.

In connection with the exemplary embodiments shown, potential differences of approximately 1,000–2,000 volts, and preferably 1,000 volts, have proven to be practical, the surface of the sample receptacle, i.e. plane 11, and layer 123 effectively being connected to zero, or ground, potential. Further details of plate 14 are disclosed in my copending application entitled COLLIMATOR FOR MEASURING RADIOACTIVE RADIATION, filed approximately concurrently with the present application and claiming priority of FRG Application P 39 15 613.3.

A test of the effectiveness of the invention was performed with an arrangement having the form shown in FIG. 1. Sample readings, in terms of pulse counts per minute, with no voltage differential between wire mesh, or screen, 120 and surface 11, and then with a voltage differential of 1500 volts. The counts per minute obtained in the latter case were between 1.5 and 2 times as great as those obtained with a voltage differential.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A device for detecting low energy ionizing radiation emanating from a plurality of samples, said device comprising: a receptacle having a surface and provided with a plurality of recesses each for holding a respective sample, each said recess being open at said surface; a cover member separate from said receptacle and having at least one planar electrically conductive member provided with openings, said conductive member being spaced from said receptacle and being disposed parallel to said surface; and a voltage source means connected between said receptacle and said conductive member to place said electrically conductive member at a potential which is positive relative to the potential of said surface and to create an electric field which substantially extends from said receptacle surface to said electrically conductive member.

2. A device as defined in claim 1 wherein said cover member comprises a frame and said electrically conductive member is a wire screen held in said frame.

3. A device as defined in claim 1 wherein said electrically conductive member is a perforated metal plate located a selected distance above said surface.

4. A device as defined in claim 1 wherein said cover member comprises a perforated plate of electrically insulating material having two opposed surfaces and said electrically conductive member is carried by one surface of said plate.

5. A device as defined in claim 4 wherein: the surfaces of said plate are parallel to said receptacle surface; said electrically conductive member is carried by the surface of said plate which is remote from said receptacle; said device further comprises a second planar electrically conductive member carried by the surface of said plate which is proximate said receptacle; and said voltage source means is connected to place said second conductive member and said receptacle surface at ground potential.

6. A device as defined in claim 1 wherein the distance between said electrically conductive member and said receptacle surface is less than 10 mm.

7. A device as defined in claim 6 wherein said source means creates a potential difference of approximately 1000–2000 volts between said electrically conductive member and said receptacle surface.

8. A device as defined in claim 1 wherein said source means creates a potential difference of approximately 1000–2000 volts between said electrically conductive member and said receptacle surface.

* * * * *